No. 828,946. PATENTED AUG. 21, 1906.
R. H. MANSON.
TELEPHONE RECEIVER.
APPLICATION FILED AUG. 3, 1904.
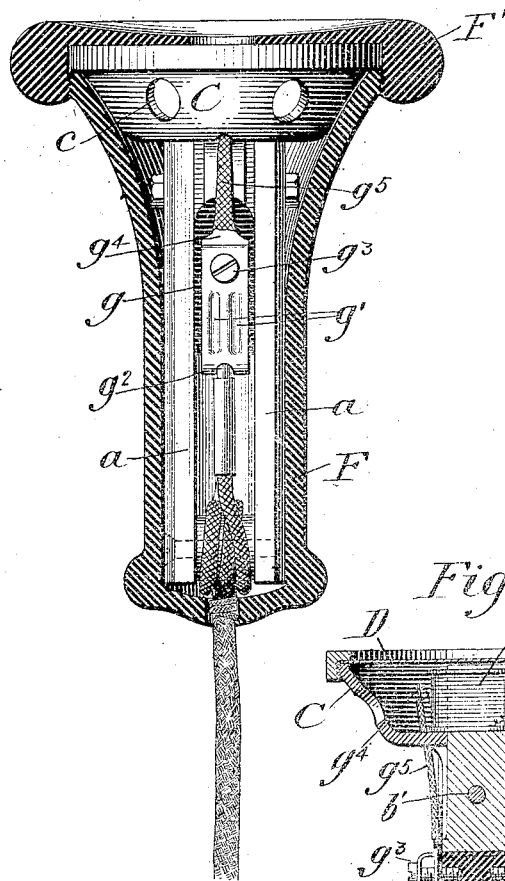
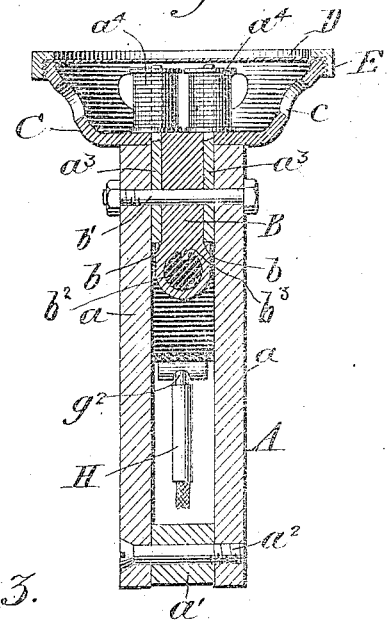
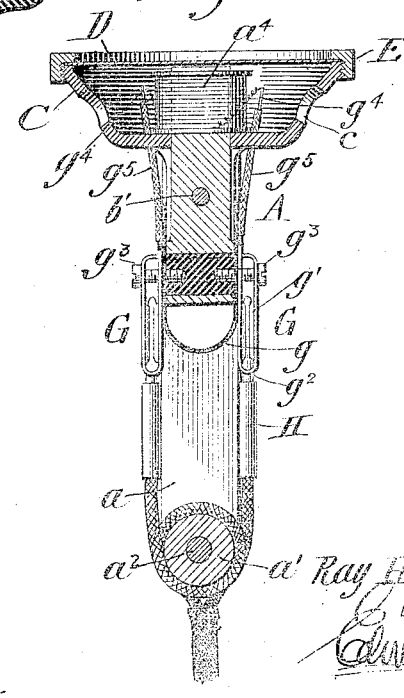

UNITED STATES PATENT OFFICE.

RAY H. MANSON, OF ELYRIA, OHIO, ASSIGNOR TO THE DEAN ELECTRIC COMPANY, OF ELYRIA, OHIO, A CORPORATION OF OHIO.

TELEPHONE-RECEIVER.

No. 828,946.

Specification of Letters Patent.

Patented Aug. 21, 1906.

Application filed August 3, 1904. Serial No. 219,567.

*To all whom it may concern:*

Be it known that I, RAY H. MANSON, a citizen of the United States, residing at Elyria, in the county of Lorain and State of Ohio, have invented certain new and useful Improvements in Telephone-Receivers, of which the following is a specification, reference being had therein to the accompanying drawings.

My invention relates to telephone-receivers, and particularly to that type in which the magnet structure, including all the operative parts, with their circuit connections, is made removable from the inclosing shell. In this type of instrument it is highly important, if not vitally essential, that the magnet structure, which is composed of several parts, should form a rigid mechanical unit when assembled and that the pole-pieces should be firmly held in a definite position relatively to the diaphragm. Also for commercial reasons and ease in manufacture, the component parts should be simple in design and capable of being readily and quickly assembled.

One of the objects of my invention therefore is to produce a receiver the magnet structure of which is composed of few parts, of simple design, which may be readily assembled to form a rigid unit.

A further object is to provide new and efficient integral means for securing the pole-pieces to the limbs of the permanent magnet of a telephone-receiver and also for constituting a support for the diaphragm.

A further object is to provide a telephone-receiver in which the magnet structure carries the diaphragm in rigid and operative relation thereto, the whole being bodily removable as a complete unit and operative receiver from a suitable inclosing shell.

A further object is to provide, in combination with a magnet structure and diaphragm-supporting cup-shaped member attached thereto, binding-posts formed to receive the terminal tips of the receiver-cord and each having a projection extending inside said cup-shaped member for connection there with the pole-piece windings.

A further object is to increase the acoustic properties of telephone-receivers.

These and other objects will more fully appear from the following specification, taken in connection with the accompanying drawings, which set forth an embodiment of my invention, while the novel features are more particularly pointed out in the appended claims.

In the drawings, Figure 1 is a view of a telephone-receiver constructed in accordance with my invention, the inclosing shell being shown in longitudinal section and the inclosed parts in elevation. Fig. 2 is a view in longitudinal section, showing the magnet structure and other operative parts as a complete unit, the inclosing shell being removed. Fig. 3 is another longitudinal section in a plane at right angles to that of the other figures, some of the parts being shown in elevation.

Referring to the drawings, the magnet structure A consists, primarily, of a permanent magnet composed of magnetized steel-bar limbs $a\ a$, connected at one end by a yoke $a'$, of metal, and screw $a^2$. At or near the end of the limbs $a$, opposite yoke $a'$, are positioned the soft-iron pole-pieces $a^3\ a^3$, each of which preferably lies in contact with one of the limbs $a$. In order to make a rigid connection for the parts at this portion of the structure, I provide a bridge-block B and cup-shaped member C, formed preferably of a single casting of non-magnetic metal.

Bridge-block B is proportioned to just fit between pole-pieces $a^3$ and has shoulders $b$, against which the rear ends of the pole-pieces abut. The ends of the magnet-limbs rest against the cup-shaped member C, and the parts are secured in this position by a bolt $b'$ or by any other suitable means. The pole-pieces are provided with the usual windings or bobbins $a^4$ within the chamber of the cup-shaped member C, and in proximity to the pole-piece ends in a diaphragm D, resting upon the flange of the cup-shaped member, where it is secured by means of a screw-threaded clamping-ring E. The outer surface of clamping-ring E is preferably knurled, so that it may be screwed down by hand.

F is an inclosing shell having a flaring end to inclose the cup-shaped member which rests against the flange thereof, where it is secured and clamped in the inclosing shell by the cap or ear piece F'.

In many receivers as at present constructed the vibrations of the diaphragm are to a considerable extent damped by the air confined within the chamber of the cup back of the diaphragm, the pole-piece openings being practically filled by the pole-pieces and insufficient to prevent this result. To obviate this difficulty and increase the acoustic properties of the instrument, I provide the cup-shaped member with a series of apertures c, which may be of any suitable number or size to permit the air-vibrations set up by the diaphragm to be communicated freely to the column of air within the receiver-shell.

The bridge-block B, in addition to its principal function above described, constitutes a support for the binding-clamps G, which are insulated from it by a strip of fiber g. These binding-clamps are each composed of a metal punching bent upon itself, the opposed flat surfaces being provided each with a pair of parallel indentations $g'$, which together form a socket or way for the cord-circuit terminal tip H, which reaches the socket through an aperture $g^2$ in the loop of the bend. The bent portions of the binding-clamps are sprung outwardly slightly and are pressed inward to grip the terminal tips when screws $g^3$ are screwed home. At the point of attachment for the binding-clamps bridge-block B is provided with a plug or insertion $b^2$, of insulating material, such as fiber, extending from side to side. To receive this plug, the bridge-block is cast with a suitable opening, as shown, at one side of which is a key-ridge $b^3$ to engage a keyway in the plug $b^2$ and keep it from turning. Screws $g^3$ of binding-posts G take into this plug, by which means and the insulating-strips g each binding-clamp is completely insulated.

Extending toward the diaphragm each binding-clamp has a projection $g^4$, which reaches through an aperture in the cup-shaped member into the chamber behind the diaphragm, where it is secured by soldering or other means to a wire of the pole-piece windings. These projections are preferably provided with insulation $g^5$ to prevent contact with adjacent metal parts. The projections also serve as steady-arms to prevent the binding-clamps from turning when the screws $g^3$ are tightened. The insulated conductors of the cord-circuit are led in through an opening in the end of the shell and secured to yoke $a'$, and tips H are then inserted in the binding-posts A.

It will be observed that by the above-described construction an operative receiver is produced independent of the inclosing shell. The parts may be made very accurately, so that the diaphragm is held rigidly in place without having to depend on the uncertainties of the rubber or composition of the inclosing shell for the pole-piece distances from the diaphragm. Also the receiver can be carried in the stock-room ready for the inclosing shell and any style of outside covering slipped over the working parts that may be desired. Furthermore, if a telephone subscriber should accidentally break the body or cap of the inclosing shell it will not disable the receiver, and it is to be particularly observed that all circuit connections are made and supported on the cup-block B, so that the magnets can be removed without destroying the connections. It is also to be noted that in assembling this instrument no grinding on final adjustment of the pole-pieces is necessary. The block B is cast finished, threaded, and with the holes to gage to the .001 of an inch. The pole-pieces are stamped or punched out with their holes and ends accurate to the same fraction. When the parts are assembled, the bolt serves as a center, and they fit perfectly with all adjustments.

Having thus described my invention, what I claim, and desire to secure by Letters Patent, is—

1. In a telephone-receiver, the combination with a magnet structure including a permanent magnet and pole-pieces, of a bridge-block coöperating with the magnet-limbs and the pole-pieces to form a rigid connection, said bridge-block provided with an insulating-plug, a cup-shaped member forming an integral extension of said bridge-block and shaped to constitute a chamber, said cup-shaped member being provided with openings through which said pole-pieces extend, windings upon said pole-pieces within the cup, a diaphragm in proximity to said pole-piece ends and secured to the rim of the cup-shaped member by a clamping-ring, suitable electrical connections carried by the plug in said bridge-block, an inclosing shell for all parts, and an ear-piece clamping the parts in the shell.

2. In a telephone-receiver, the combination with a magnet structure including a permanent magnet and pole-pieces, of a bridge-block coöperating with said magnet-limbs and the pole-pieces to form a rigid connection, a cup-shaped member extending from said bridge-block and shaped to constitute a chamber for the pole-piece ends and their windings, binding-posts or clamps mounted upon opposite sides of said bridge-block but insulated therefrom, each binding post or clamp being provided with an opening to receive a cord-circuit tip and having an extension provided with insulation and passing through the wall of the cup-shaped member for connection with the pole-piece windings, and an inclosing shell for the parts, substantially as described.

3. In a telephone-receiver, the combination with a magnet structure including a permanent magnet, and pole-pieces with their windings, of a bridge-block coöperating with the magnet-limbs and the pole-pieces to form a rigid connection, a plug of insulation extending transversely through said bridge-block between said magnet-limbs, and cord-circuit terminal means for connection with said windings mounted upon the magnet structure but insulated therefrom and secured to said plug, substantially as described.

4. In a telephone-receiver, the combination with a magnet structure including a permanent magnet, and pole-pieces with their windings, of a bridge-block coöperating with the magnet-limbs and pole-pieces to form a rigid connection, said bridge-block being provided with an opening extending transversely between said magnet-limbs and having a key or ridge, an insulating-plug located in said opening and formed with a keyway to receive said key, and cord-circuit terminal means for connection with said windings mounted upon the magnet structure but insulated therefrom and secured to said plug, substantially as described.

5. In a telephone-receiver, the combination with a magnet structure including a permanent magnet and pole-pieces, of a metallic bridge-block coöperating with the magnet-limbs and the pole-pieces to form a rigid connection, a diaphragm-supporting member connected to said metallic bridge-block, terminal devices mounted upon said bridge-block and means carried by the terminal members whereby they are prevented from turning.

6. In a telephone-receiver, the combination with a magnet structure including a permanent magnet and pole-pieces, of a bridge-block coöperating with the magnet-limbs and pole-pieces to form a rigid connection, a cup-shaped member forming an integral extension on said bridge-block and shaped to constitute a chamber for the pole-piece ends and their windings, terminal clips rigidly secured to said bridge-block and means engaging said cup-shaped member whereby the terminal clips are prevented from turning.

7. A telephone-receiver comprising a permanent magnet, pole-pieces and their windings, a bridge-block separating the limbs of said magnet and the pole-pieces, a cup-shaped diaphragm-supporting member integral with said bridge-block and forming a receptacle for the reception of said pole-piece ends and their windings, a diaphragm supported by said member, a plug in said bridge-piece, and terminal devices connected to the plug.

8. In a telephone-receiver the combination with a permanent magnet, of a bridge-block separating the limbs thereof, a diaphragm-supporting member integral with said bridge-block, pole-pieces held between the limbs of said magnet and having their windings within the diaphragm-supporting member, means on the bridge-block forming an abutment for the pole-pieces, terminal devices having projecting ends secured to said bridge-block, and means engaging said projecting ends to prevent said devices from turning.

9. In a telephone-receiver, the combination with a magnet structure comprising a permanent magnet and pole-pieces with their windings, of a separating device for the pole-pieces and the limbs of the magnet comprising a non-magnetic bridge-block having a reduced portion for the reception of the pole-pieces and an integral cup-shaped extension for the reception of the windings of said pole-pieces, a keyed aperture through said bridge-block, an insulating-plug within said keyed aperture and terminal members having projections and secured to said plug, the projections on said terminal members adapted to enter apertures in said cup-shaped extension, whereby the terminal members are prevented from turning.

In testimony whereof I affix my signature in presence of two witnesses.

RAY H. MANSON.

Witnesses:
S. A. BEYLAND,
WILLIAM W. DEAN.